T. E. BISSON.
CALIPERS.
APPLICATION FILED JAN. 23, 1918.
1,267,964.
Patented May 28, 1918.
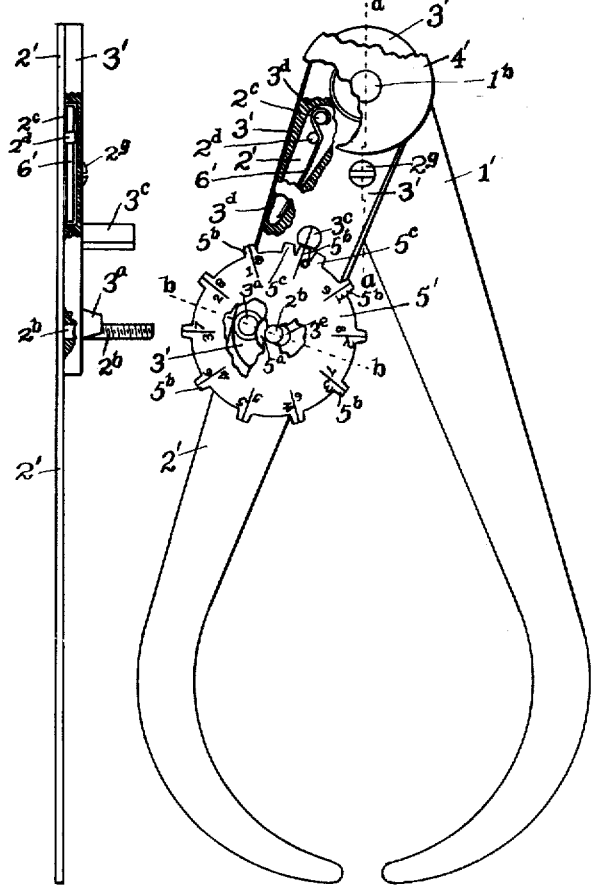
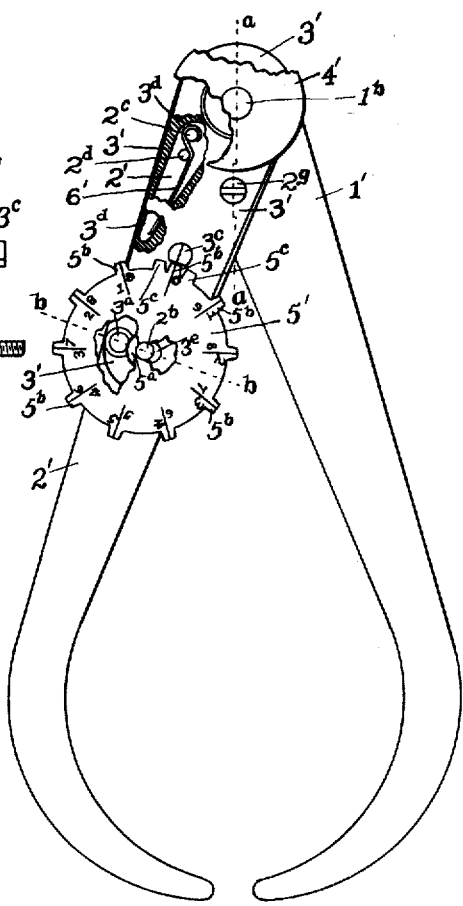
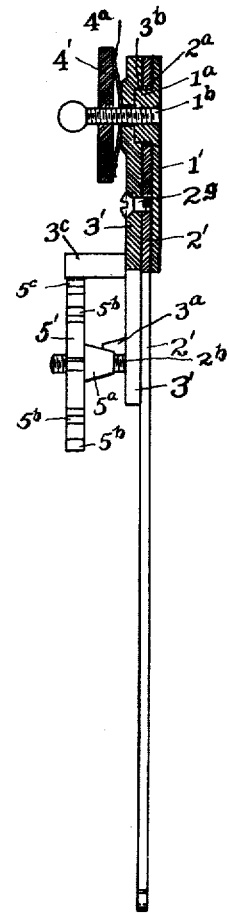
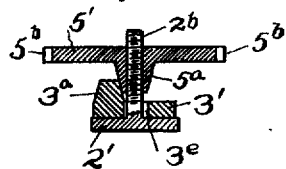
Theodore E. Bisson
INVENTOR.
BY David E. Lain
ATTORNEY

UNITED STATES PATENT OFFICE.

THEODORE E. BISSON, OF BELLINGHAM, WASHINGTON.

CALIPERS.

1,267,964.    Specification of Letters Patent.    Patented May 28, 1918.

Application filed January 23, 1918. Serial No. 213,398.

*To all whom it may concern:*

Be it known that I, THEODORE E. BISSON, a citizen of the United States, and a resident of Bellingham, in the county of Whatcom and State of Washington, have invented a new and useful Calipers, of which the following is a specification.

My invention relates to improvements in calipers, and the object of my invention is to provide transfer calipers which can be used as a substitute for a micrometer screw gage.

I accomplish this object with the device illustrated in the accompanying sheet of drawings in which—

Figure 1 is a plan view of my calipers, Fig. 2 is a side elevation of Fig. 1 in section on the line $a$—$a$, Fig. 3 is an end elevation of a part of Fig. 1 in section on the line $b$—$b$, and Fig. 4 is a side elevation of separated parts of my calipers.

Similar characters refer to similar parts throughout. Certain parts are broken away in order to show others hidden thereby.

More particularly: 1' is the lower leg 1$^a$ is a boss on the upper end of leg 1' used as a joint pivot. 1$^d$ is a stud screw centrally fixed in boss 1$^a$. 2' is the upper leg. 2$^a$ is a hole in the upper end of leg 2', larger than boss 1$^a$ over which it is placed. 2$^d$ is a stud screw fixed in leg 2'. 2$^c$ is a stud pin fixed in leg 2', with which spring 6' is engaged. 2$^b$ is a stud pin fixed in leg 2', over which spring 6' is bent. 3' is a lever pivoted to leg 2' by screw 2$^g$. 3$^a$ is the frustum of a cone fixed to lever 3'. 3$^d$ is a counterbore in the lower side of the upper end of lever 3' into which hinge boss 1$^a$ makes a snug turning fit. Said counterbore is not deep enough to permit leg 2' to be clamped between leg 1' and lever 3', but leg 2' is always free to move between leg 1' and said lever to the limits of hole 2$^a$. 3$^c$ is a datum stud fixed on the upper side of lever 3'. 3$^d$ is a cavity in the lower side of lever 3' to accommodate pins 2$^c$ and 2$^d$ and spring 6'. 3$^e$ is a slotted hole in lever 3' in which stud screw 2$^b$ stands. 4' is a hand wheel having a central tapped hole engaged on screw 1$^b$. 4$^a$ is a spring leaf on screw 1$^d$ under wheel 4'. 5' is a graduated hand wheel having a tapped central hole engaged with stud screw 2$^d$. 5$^a$ is a conical hub centrally fixed on the lower side of hand wheel 5'. 5$^d$, 5$^d$, etc., are ten teeth equally spaced on the periphery of hand wheel 5', each having a radial, equally-spaced and numbered, graduating mark. 5$^c$, 5$^c$ are two teeth on hand wheel 5', one close to either side of the tooth having the cipher mark. 6' is a spring engaged on pin 2$^c$, bent over pin 2$^b$ and bearing on one side of cavity 3$^b$. The graduations on hand wheel 5' are preferably numbered to the right and left of the cipher in two sets of figures. Cone 3$^a$ is located to bear on conical hub 5$^a$ under pressure of spring 6'. Datum stud 3$^c$ is located near the ends of teeth 5$^b$ and its mark registers with the marks of said teeth as hand wheel 5' is turned on screw 2$^b$. The distance from the center of pivot 1$^a$ to fulcrum screw 2$^g$, the distance from said pivot to stud screw 2$^b$, the distance from said pivot to the ends of legs 1' and 2', the pitch of the threads on stud screw 2$^b$ and the angle of cones 3$^a$ and 5$^a$ are preferably related to cause the distance between the ends of the caliper legs to be changed one one-thousandth of an inch when hand wheel 5' is turned one tenth of a revolution. From the description it can be readily understood that the movement of the lower end of lever 3' caused by turning hand wheel 5' on screw 2$^b$ will cause the upper end of leg 2' to move relative to the upper ends of leg 1' and lever 3' and thus cause leg 2' to turn about screw 2$^g$ and its lower end will approach or recede from the lower end of leg 2'.

In operation, the ends of the caliper legs are set, as near as may be, the desired distance apart, hand wheel 4' is screwed down to clamp the calipers, then they are set to the exact distance desired by turning hand wheel 5' in a counter-clockwise direction, if the original setting is to be increased, and in a clockwise direction if said setting is to be diminished. Now assume that it is desired to increase the setting of the calipers two-thousandths of an inch. The position of the cipher mark on hand wheel 5' is noted and said hand wheel turned two spaces in a counter-clockwise direction, when the desired increase has been made. Similarily any desired reduction in said setting may be made by turning said hand wheel the indicated distance in a clockwise direction. Furthermore, until the calipers are unclamped the settings of the same can be changed and returned to as desired. Thus my calipers are suited for the same class of work as a micrometer screw gage and, because of their form, they are more convenient and have a wider range of usefulness.

Teeth 5$^b$, 5$^b$, etc., not only aid in providing a hand hold for hand wheel 5' but, in connection with teeth 5$^c$, 5$^c$, furnish a ready means to quickly read the setting of said hand wheel without close examination.

I am aware that it is not new to use fulcrum lever 3' and cones 3$^a$ and 5$^a$ on calipers substantially as described. But what I claim as new and desire to secure by Letters Patent is:—

1. In combination, a graduated hand wheel having a tapped central hole, a conical hub centrally positioned on the lower side of said handwheel, a pair of calipers having a stud screw fixed on one leg, and engaged in the tapped hole in said hand wheel, a spring-pressed lever fulcrumed on said caliper leg, a cone fixed on the lower end of said lever and bearing on said conical hub, a datum stud fixed on said lever and bearing a mark registerable with the graduations on said hand wheel, a pivot joint between the other end of said lever and the upper end of the other caliper leg, and means to clamp said pivot joint.

2. In combination, a graduated hand wheel having a tapped central hole, a conical hub fixed centrally on the lower side of said hand wheel, a plurality of spaced teeth on the periphery of said graduated hand wheel each of which bears a radial graduating mark, a pair of calipers having a stud screw fixed on one leg and engaged in said tapped hole in said hand wheel, a spring-pressed lever fulcrumed on said caliper leg, a cone fixed on the lower end of said lever and bearing on said conical hub, a datum stud fixed on said lever and bearing a mark registerable with the graduations on said hand wheel, a pivot joint between the upper end of said lever and the upper end of the other caliper leg, and means to clamp said pivot joint.

3. In combination, a hand wheel having numbered graduations thereon and also having a tapped central hole, a plurality of spaced teeth on the periphery of said hand wheel each of which bears a radial, numbered graduating mark, a tooth near and on each side of the 0 tooth of said spaced teeth, a conical hub fixed centrally on the bottom of said hand wheel, a pair of calipers having a stud screw fixed on one leg and engaged in said tapped hole in said handwheel, a spring-pressed lever fulcrumed on said caliper leg, a cone fixed on the lower end of said lever and bearing on said conical hub, a datum stud fixed on said lever and bearing a mark registerable with the graduations on said hand wheel, a pivot joint between the upper end of said lever and the upper end of the other caliper leg, and means to clamp said pivot joint.

THEODORE E. BISSON.

Copies of this patent may be obtained for five cents each, by addressing the "Commissioner of Patents, Washington, D. C."